(12) United States Patent
Joshi et al.

(10) Patent No.: US 11,880,366 B2
(45) Date of Patent: Jan. 23, 2024

(54) INDEX-BASED, ADAPTIVE JOIN SIZE ESTIMATION

(71) Applicant: SAP SE, Walldorf (DE)

(72) Inventors: Yogi Joshi, Waterloo (CA); Sergiu Pocol, Kitchener (CA); David DeHaan, Burlington (CA); Daniel Farrar, Kitchener (CA); Anisoara Nica, Waterloo (CA)

(73) Assignee: SAP SE, Walldorf (DE)

( * ) Notice: Subject to any disclaimer, the term of this patent is extended or adjusted under 35 U.S.C. 154(b) by 304 days.

(21) Appl. No.: 17/323,867

(22) Filed: May 18, 2021

(65) Prior Publication Data

US 2022/0382757 A1 Dec. 1, 2022

(51) Int. Cl.
*G06F 16/2453* (2019.01)

(52) U.S. Cl.
CPC .. *G06F 16/24544* (2019.01); *G06F 16/24537* (2019.01)

(58) Field of Classification Search
CPC ......... G06F 16/24544; G06F 16/24537; G06F 16/2237; G06F 16/2456
See application file for complete search history.

(56) References Cited

U.S. PATENT DOCUMENTS

| | | | |
|---|---|---|---|
| 2003/0018615 A1* | 1/2003 | Chaudhuri | G06F 16/2462 |
| 2007/0136317 A1* | 6/2007 | Przywara | G06F 16/2456 |
| 2007/0233648 A1* | 10/2007 | Zuzarte | G06F 16/2462 |
| 2011/0055198 A1* | 3/2011 | Mitchell | G06F 16/2455 |
| | | | 707/E17.136 |
| 2015/0186493 A1* | 7/2015 | Balmin | G06F 16/9535 |
| | | | 707/737 |
| 2019/0361892 A1* | 11/2019 | Krishna | G06F 16/1865 |
| 2022/0197950 A1* | 6/2022 | Peri | G06F 16/9024 |

OTHER PUBLICATIONS

Leis et al., "Cardinality estimation Done Right: Index-Base Join Sampling" hereinafter Leis (Year: 2017).*
Communication, extended European Search Report, dated May 12, 2022, issued by the European Patent Office, Patent Application No. 21210632.2-1203 (13 pages).
Chakkappen et al., "Adaptive Statistics in Oracle 12c," *Proceedings of the VLDB Endowment*, 10(12):1813-1824 (2017).
Kipf et al., "Learned cardinalities: Estimating Correlated Joins with Deep Learning," *CIDR'19*, Jan. 13-16, Asilomar, California, USA, 8 pages (2019).

(Continued)

*Primary Examiner* — Mark D Featherstone
*Assistant Examiner* — Kweku William Halm
(74) *Attorney, Agent, or Firm* — Klarquist Sparkman, LLP (57) ABSTRACT

Systems, methods, and computer media are described for index-based join size estimation. For a join operation between two tables, a filter is applied to the first table, resulting in a filter output. The filter output is then sampled. For each sample, an index for a second table is accessed and counts of records in the second table that match the sample are retrieved. Using the sample size and the retrieved counts from the index of the second table, a data size for the join operation can be efficiently and accurately estimated. Statistical confidence in the estimate can also be assessed using variance-based calculations.

18 Claims, 6 Drawing Sheets

(56) References Cited

OTHER PUBLICATIONS

Leis et al., "Cardinality Estimation Done Right: Index-Based Join Sampling," *CIDR'17*, Jan. 8-11, Chaminade, CA, USA, 8 pages, (2017); Online Proceedings: www.cidrdb.org.
Lipton et al., "Query Size Estimation by Adaptive Sampling," *Journal of Computer and System Sciences*, 51:18-25 (1995).
Moerkotte et al., "Exploiting Ordered Dictionaries to Efficiently Construct Histograms with Q-Error Guarantees in SAP HANA,", *SIGMOD'14*, Jun. 22-27, Snowbird, UT, USA, *ACM*, pp. 361-372, (2014); Online: http://dx.doi.org/10.1145/2588555.2595629.
Wang et al., "Improved Correlated Sampling for Join Size Estimation," downloaded from https://www.comp.nus.edu.sg/~taining/estimation/report.pdf, pp. 1-15 (document not dated; downloaded on May 14, 2021).

* cited by examiner

INDEX-BASED, ADAPTIVE JOIN SIZE ESTIMATION

BACKGROUND

For a given query, there are typically multiple possible execution plans that arrive at the same result. Different execution plans, however, can use vastly different amounts of computing resources. Join operations, for example, can be ordered in an execution plan to avoid inefficiencies such as creation of large intermediate results.

DETAILED DESCRIPTION

The examples described herein generally estimate join size through an index-based approach. Some examples also use a variance-based adaptive sampling approach to provide statistical confidence on join size estimates.

When queries (e.g., structured query language (SQL) queries) are received in a database management system (DBMS), an execution plan is developed and/or followed to perform the various operations needed to retrieve results for the query. The order in which operations are performed, and the type of operation, can greatly affect the amount of data processed, computation time, or other resources needed to retrieve the results.

As an example, consider a join of three tables, T1, T2, and T3. A join is only performed on two tables at a time, so two tables must be joined first to create an intermediate result, and the intermediate result is then joined with the remaining table. If, for example, the intermediate result formed by joining T1 and T2 is small, it is likely more efficient to join T1 and T2 first and then join T3 to the intermediate result. In contrast, if the intermediate result formed by joining T1 and T2 is large (e.g., a many-to-many join), it is likely more resource intensive to join T1 and T2 first. Similarly, different physical algorithms (e.g., hash pushdown join, sorted merge join, etc.) for performing the join operation can be selected depending on data size. As an example, a hash pushdown join is generally more efficient than other physical algorithms (as compared to, for example, a sorted merge join). However, it has higher memory requirements, which may cause it to be a poor choice for larger amounts of data.

Accurately estimating join size allows the query execution plan to be developed efficiently through query optimization. Query optimization is the process of determining the order in which operations should be performed, which physical algorithms should be used to carry out operations, and other aspects of the query execution plan. In this context, "optimization" does not necessarily mean that a "best" execution plan is determined but rather refers to the process of making the query execution plan resource efficient.

Join size (also referred to as "cardinality") estimation can be performed in a variety of ways. Some approaches are machine-learning based and involve featurization (creating a feature vector) of intermediate results and model training. Other approaches involve sampling, both online (performed dynamically) or offline (samples persisted in memory) or use of histograms/statistics.

The examples described herein use an index-based approach to join size estimation. Consider an example in which Table A is joined with Table B, with a filter associated with Table A but no filter associated with Table B. The filter is applied to Table A to create a filter output (records in Table A that match the filter criteria). Sampling is then performed on the filter output (rather than on the unfiltered base table as is done in some other approaches) to create a filtered sample. Table B has an associated index. Rather than sampling Table B and performing a join of the filtered sample and the Table B sample, the examples described herein retrieve and use match counts (counts of matching records) from Table B's index.

In this approach, for each record in the filtered sample, the index of Table B is accessed to determine the count of matching records in Table B. The index lookup is quick, efficient, and does not incur substantial additional storage costs. The sample size of the filtered sample and the match counts (e.g., sum of match counts for all of the records in the filtered sample) can be used to estimate a data size for the join operation between Table A and Table B.

In some of the described examples, a statistical confidence on join size estimates is assessed using a variance-based approach. Multiple iterations of sampling the filter output and retrieving match counts from the index of Table B can be performed, and the sample size and match counts for each iteration can be evaluated using a variance calculation. If a desired statistical confidence has not been reached, another iteration can be performed. In some examples, after each iteration, a new sample size is determined. The number of iterations can be limited by a budget that specifies a maximum number of index lookups to limit the resources expended in estimating the join size.

The described examples provide accurate join size estimates efficiently and with statistical confidence. The index-based approach reduces the computing resources that would be needed for additional sampling, and application of filters prior to sampling and variance calculations improve accuracy. The improved join size estimates are used to develop more efficient query execution plans that result in faster, less-resource-intensive query execution. Examples are described below with reference to FIGS. 1-6.

Cost-based query optimizers rely on cardinality estimates of intermediate results to avoid suboptimal query execution plans. However, when confronted with ad-hoc queries on big data, said optimizers can produce large estimation errors, resulting in drastic decreases in overall performance. Such errors occur because many estimation algorithms for joins make use of strong independence and uniformity assumptions. Moreover, equi-joins on skewed data with filter predicates tend to cause the aforementioned assumptions to fail. Because the cardinality estimate of a result with many joins depends on estimates of the underlying joins, improving the accuracy of join size estimates in a "bottom-up" order can significantly improve performance.

Certain join size estimation approaches that use offline samples fare poorly with filtering and can suffer from insufficient sample size. Some query optimizers make use of persisted histograms. The associated storage space of such approaches is a large deterrent, as is the case with persisting offline samples. The described examples estimate join size through approaches that 1) sample filtered base tables and 2) make use of persisted counts in indexes (e.g., B+-tree indexes). The described approaches can also provide statistical confidence on estimates.

The described examples can be easily incorporated into query optimizers that utilize bottom-up enumeration and evaluate filter predicates prior to optimization. In contrast with existing machine learning based approaches, the described examples are simpler to implement or derive from existing support for sampling. Join size estimates are produced using persisted counts in indexes from index-based sampling. The amount of sampling conducted can limited by either reaching a parameterized budget or achieving sufficient statistical confidence in an estimate. On a subset of industry-standard benchmark queries involving joins on skewed data, the described examples improved the overall execution time by 16%. Amongst queries with execution plans altered by the improved estimates of the described examples, the mean percentage improvement in individual execution time was 34%.

Figure 1:
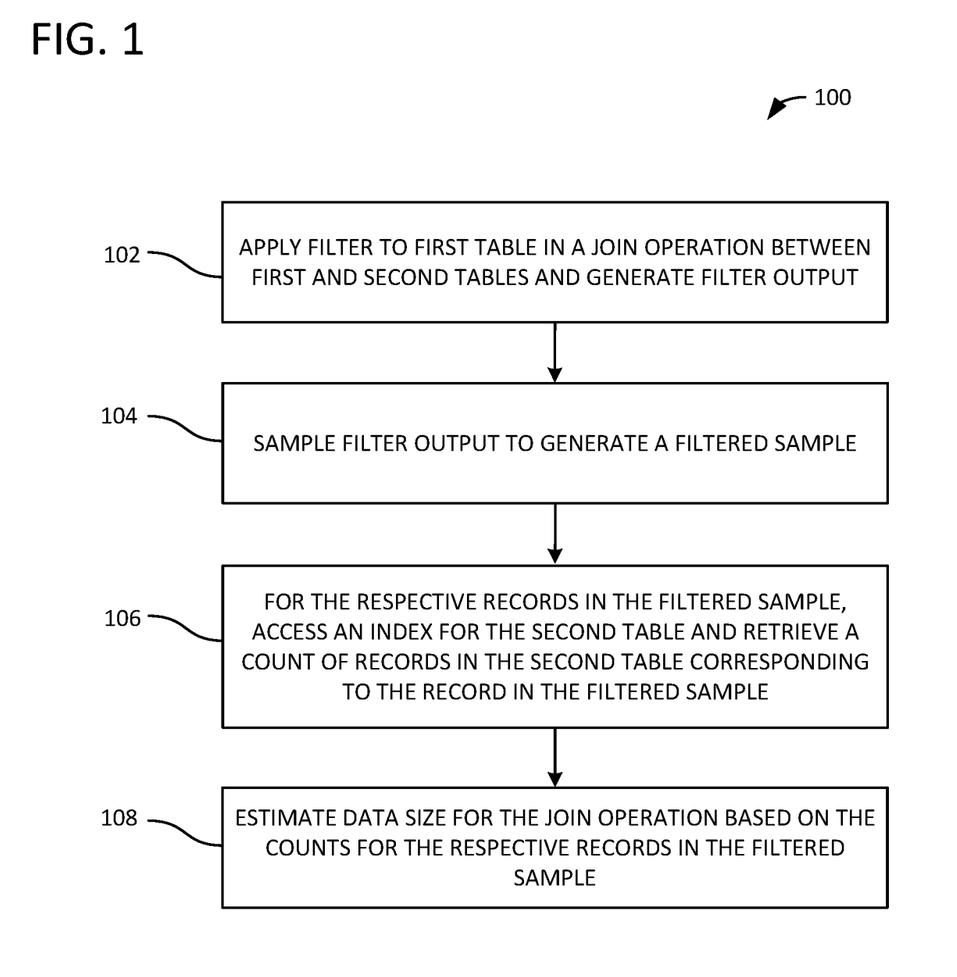
FIG. 1 illustrates an example method of estimating join size.

FIG. 1 illustrates a method 100 of estimating join size. In process block 102, a filter is applied to a first table in a join operation between the first table and a second table, and a filter output is generated. The filter (also referred to as a filter predicate) specifies a value or feature, and the records in the filter output match the value or feature. In the case that this join is "one-to-many," the first table can also be referred to as the "primary key source," and the second table can also be referred to as the "foreign key source." Every value in the latter is guaranteed to have exactly one matching value in the (unfiltered) former. In some examples, filters can be applied to both the first and second table.

In process block 104, the filter output is sampled to generate a filtered sample. The filtered sample is a subset of records from the filter output. The sampling can be done according to a predefined sample size out of the total records in the filter output, such as 500 records, 1000 records, 1500 records, etc. In some examples, a percentage (e.g., 1%, 5%, 0.1%, etc.) of the first table or filter output can be used as a sample size.

For the respective plurality of records in the filtered sample, an index for the second table is accessed in process block 106, and a count is retrieved of records in the second table that correspond to the record in the filtered sample. A data size for the join operation is estimated in process block 108 based on the counts for the respective records in the filtered sample. A detailed example estimation approach is illustrated below in Table 1.

As a specific example, a first sample might have a match count of 5, a second sample, might have a match count of 3, and a third sample might have a match count of 11, etc. The match counts for a sample can summed (sample size $n_i=3$, match counts $X_i=19$) and a join factor $\mu_i$ can be calculated by dividing the retrieved match counts $X_i$ by the sample size $n_i$. The join factor can then be used to estimate join size as shown, for example in Table 1.

In some examples, the sampling, accessing the index, and retrieving the count of records are performed iteratively until either a target statistical confidence level or a resource expenditure threshold is reached. The resource expenditure threshold can be a budget of index lookups (e.g., a limit of 5000 lookups), a time threshold (e.g., three seconds), or other threshold. In examples where the resource expenditure threshold is an available index lookup count (budget), the budget can be decremented by the sample size for each iteration (because there is one index lookup per sample). In examples where a join factor is calculated, the join factor can be recalculated for each iteration. After each iteration, a new sample size can also be determined for sampling in the next iteration.

The statistical confidence level can be determined using a variance-based approach that assesses the sampling and the retrieved counts of records. A quality test can then be used to assess the confidence level. For example, an upper bound on the population variance of the join factor can be calculated. In other examples, the sample variance, an unbiased estimator of the population variance between match count values, can be calculated. Generally, the quality test checks that the variance metric is sufficiently small. For example, a confidence interval around an estimate of the mean match join factor can be deduced using the sample variance, and the width of this interval can be compared to a threshold.

In some examples, both a resource expenditure threshold and a statistical confidence level are used together. In such approaches, iterations continue in pursuit of the desired statistical confidence while there is budget remaining. If budget is exhausted prior to the desired confidence being reached, then a most current join size estimate or join factor can be used, or a default rule-based join size estimation approach can be used instead of estimating the join size using the index-based sampling. The default approach could be the approach used by SAP IQ database analytics software in which a variety of heuristics are used to improve over a naïve estimate based upon independence assumptions by utilizing available pre-computed information about data distributions of join predicate columns, known or inferred relationships between joining tables based upon database schema or query join topology, or other sources of statistical information about the data being joined. Other default approaches are also possible.

In some examples, method 100 is performed after determining that the join operation has one or more characteristics indicating that a default size estimation approach is likely to be inaccurate. For example, the default size estimation approach can be inaccurate where the join operation is a many-to-many join or a one-to-many join with filtering on the primary key source. If the default approach is likely to be accurate because the join operation does not have such characteristics, the default approach can be used. This triage allows the (typically simpler and faster) default approach to be used where appropriate and accurate and the index-based sampling approach to be used in other situations.

The join operation corresponds to a received query. Method 100 can further comprise determining or modifying a query execution plan for the query based on the estimated data size for the join operation. For example, the join operation can be ordered relative to other operations in the query execution plan or a physical algorithm can be selected for the join operation.

Method 100 estimates a join size between two tables but can also be used to estimate size for a join of greater than two tables. In such situations, the records in the second table that match the filtered sample can be sampled to create an intermediate sample (also referred to as an intermediate result), and join size can be estimated using the approach of method 100 between the intermediate sample and a third table.

Figure 2:
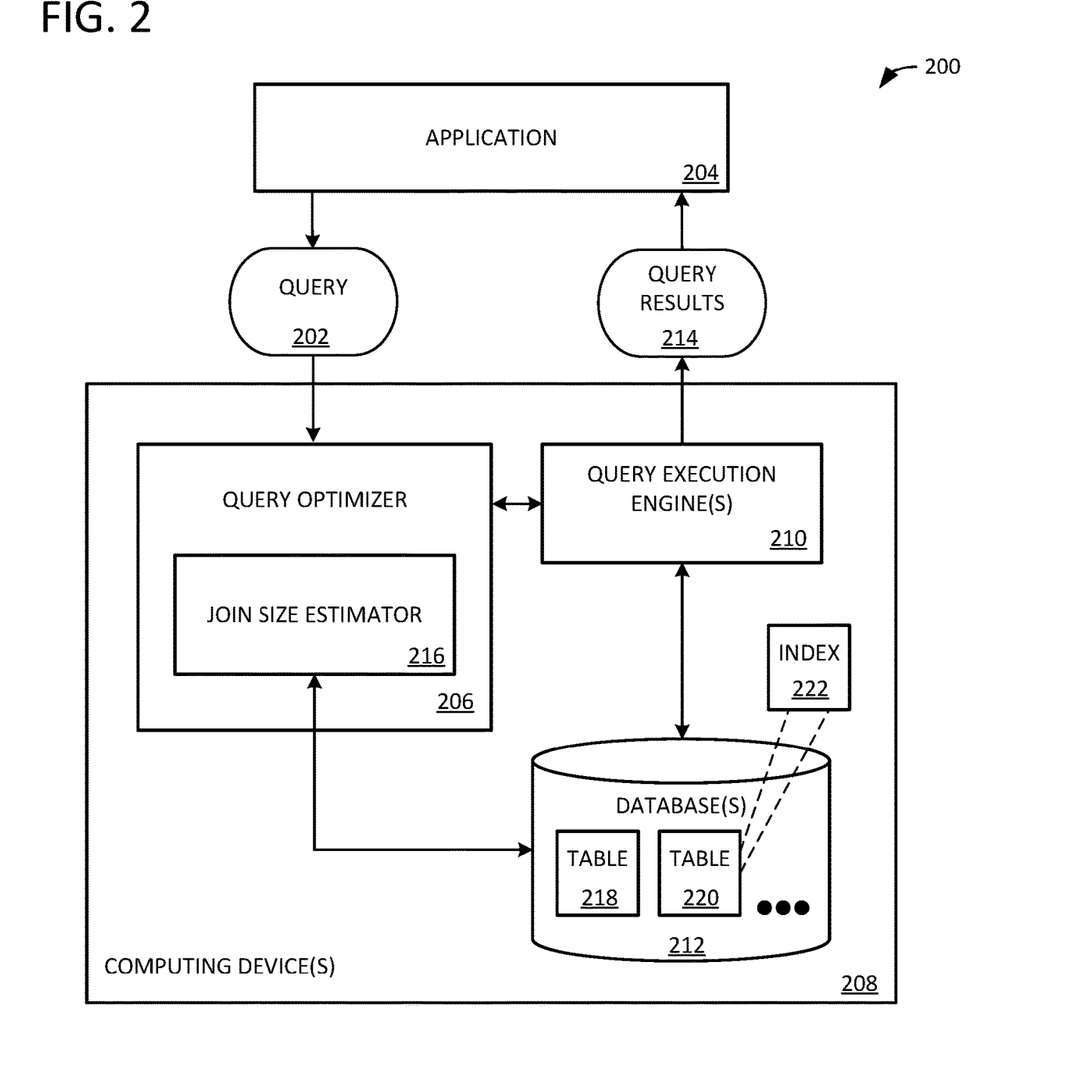
FIG. 2 illustrates an example system configured to estimate join size using an index-based approach.

FIG. 2 illustrates a system 200 configured to estimate join size through an index-based approach. System 200 can implement method 100 of FIG. 1 as well as methods 300, 400, and 500 of FIGS. 3, 4, and 5, respectively. System 200 can be, for example, used with or part of an online analytical processing (OLAP) or other system. A query 202 is received from an application 204 at query optimizer 206. For situations in which query 202 is parsed prior to optimization, query optimizer 206 can also include parsing functionality, or a separate query parser (not shown) can be used prior to query optimizer 206. Query optimizer 206 is part of a database management system (DBMS) implemented on computing device(s) 208.

Query execution engine(s) 210 execute optimized queries against database(s) 212 and returns query results 214. Join size estimator 216 estimates the size of join operations, for example using method 100, 300, 400, or 500, so that query optimizer 206 can order join operations, select physical algorithms, and otherwise organize an efficient query execution plan for execution by query execution engine(s) 210.

Join size estimator 216 has access to database(s) 212, which is configured to store tables 218 and 220, which can be the first and second tables referenced by method 100 of FIG. 1. Index 222 is associated with and stored with table 220. Match counts can be retrieved from index 222 for a filtered sample based on table 218. In some examples, each table stored in database 212 has an associated index.

Figure 3:
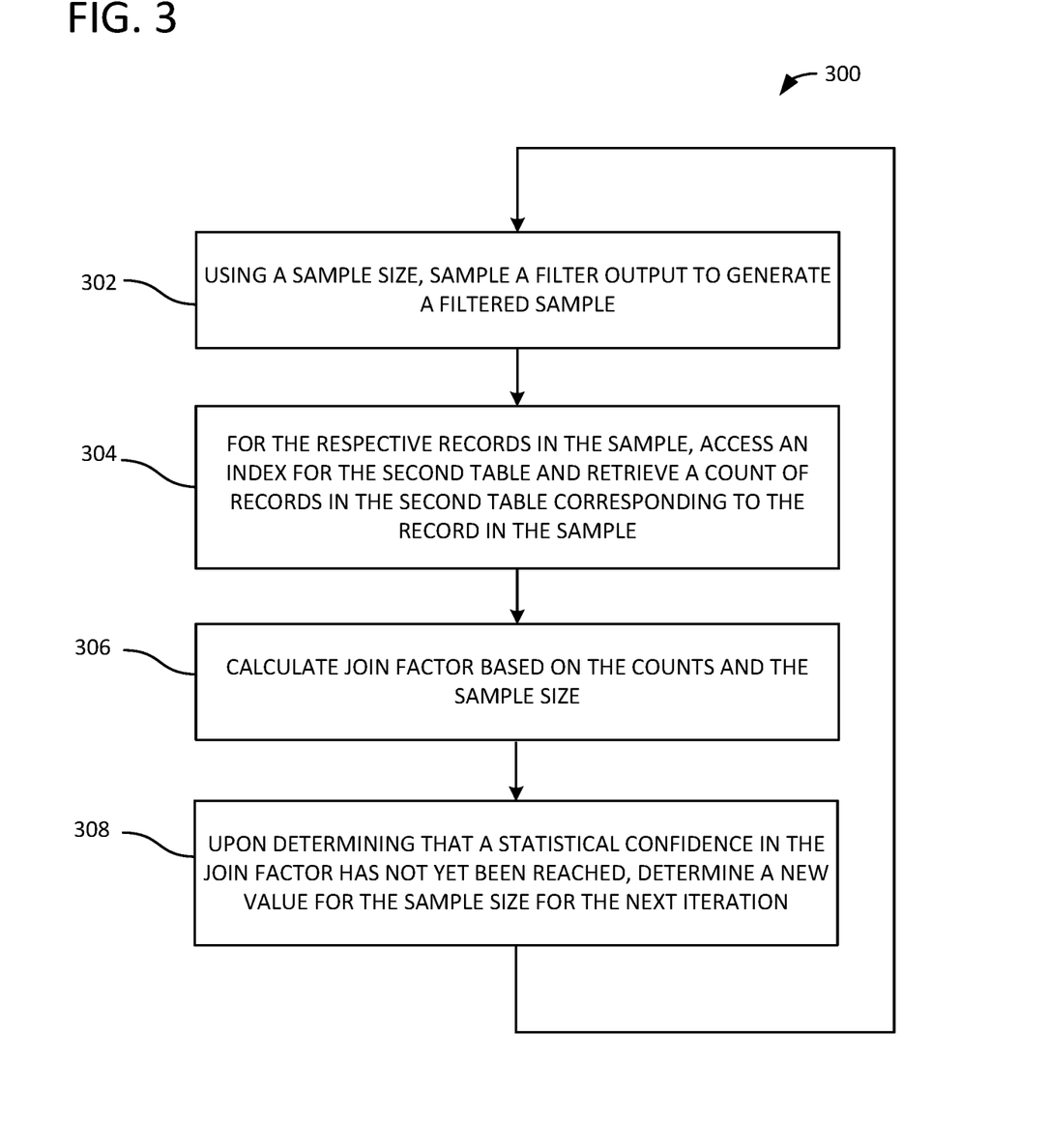
FIG. 3 illustrates an example iterative method of estimating join size.

FIG. 3 illustrates an iterative join size estimation method 300 for a join operation between a first table, to which a filter has been applied, and a second table. Iterations are performed until a statistical confidence in a join factor for the join operation has been reached. The iterations comprise process blocks 302, 304, 306, and 308. As with method 100, method 300 can also be performed using an intermediate sample and treating the intermediate sample as the first table. The second table is a base table that has an index with persisted match counts.

Intermediate samples on joins can be collected such that the tuples sampled originated from tuples in the first table's filtered samples joined with a random sample of the tuples from the second table. Such an intermediate sample is deemed "valid" if its size estimate has passed the quality test. Valid samples can be treated as a base table in higher-level join size estimation because the tuples it contains were statistically sufficient in capturing the relationship between the join attributes/columns in the underlying base tables. A data structure can be used as a "cache" to store these intermediate samples as the query optimizer performs "bottom-up" enumeration. Resultantly, statistically confident intermediate samples on two-table joins can be available for three-table join size estimation, and so on. If a join between a base table and some intermediate result does not have an intermediate sample available, then its corresponding size estimation can be performed using conventional means.

In process block 302, using a sample size, a filter output of the filter is sampled to generate a filtered sample, the filtered sample comprising a sample size number of records from the filter output. In process block 304, for the respective records in the filtered sample, an index is accessed for the second table and a count of records in the second table corresponding to the record in the filtered sample is retrieved. In process block 304, the join factor is calculated based on the counts for the respective records in the filtered sample and the sample size of the filtered sample. Upon determining that a statistical confidence in the join factor has not yet been reached, a new value for the sample size is determined for a next iteration in process block 308.

Example sample size determinations are discussed below with respect to Table 1. In some examples, a predetermined number of iterations of a fixed sample size can be performed before determining a new value for the sample size for successive iterations. In other examples, the sample size remains fixed for each iteration (i.e., the "new value" for the sample size is the same each iteration). After the iterations have ended, a data size is estimated for the join operation using the join factor. A query execution plan can then be modified or determined based on the join size estimate.

Figure 4:
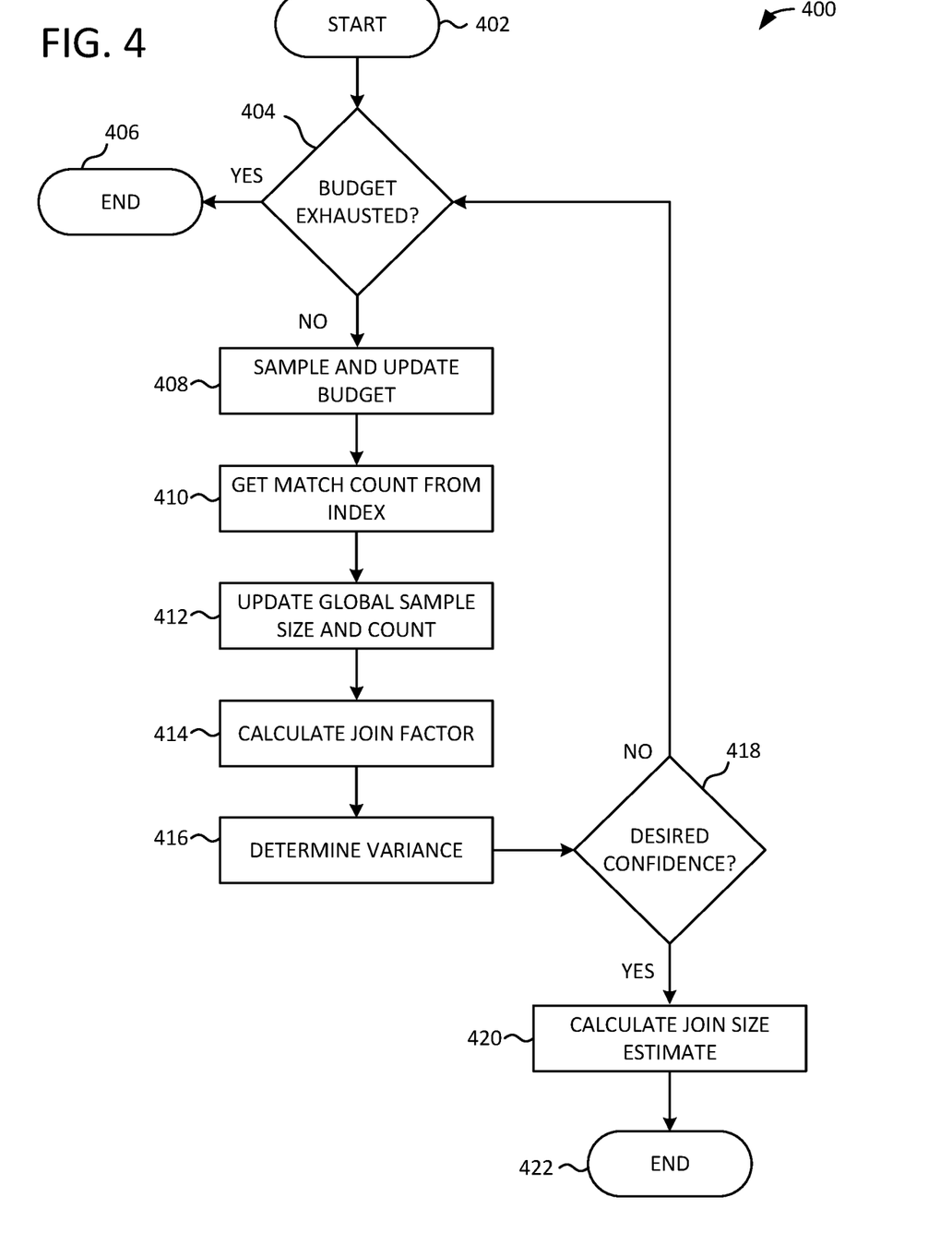
FIG. 4 is a flow chart illustrating an example iterative join size estimation method in which a budget of index lookups is used.

FIG. 4 illustrates an example method 400 of estimating join size between two tables. In process block 402, method 400 begins. In decision block 404, it is determined whether an index lookup budget has been exhausted. If yes, then method 400 ends at process block 406 and either a most recent join size estimate is used or an estimate is determined using a default approach. For a first iteration, the budget will not be exhausted. If the budget is not exhausted, then a first base table to which a filter has been applied is sampled to determine a filtered sample, and based on the number of samples, the budget is updated (e.g., decremented or incremented). In process block 410, a match count is retrieved by accessing an index of the second table. In process block 412, a global sample size N and a global match count sum X are updated. Each iteration, the new sample size is added to the global sample size and the sum of the new match counts is added to the global match count sum.

In process block 414, a join factor is calculated. The join factor can be calculated as, for example, X/N. In process block 416, a population variance in the join factor is calculated. In decision box 418, the calculated variance is compared to a desired variance (confidence level). If the desired variance has not been reached, method 400 returns to decision block 404 and another iteration begins. In some examples, a new sample size is calculated for the next iteration. If the desired confidence level has been reached, then a join size estimate is calculated in process block 420 using the join factor. Method 400 ends in process block 422.

Figure 5:
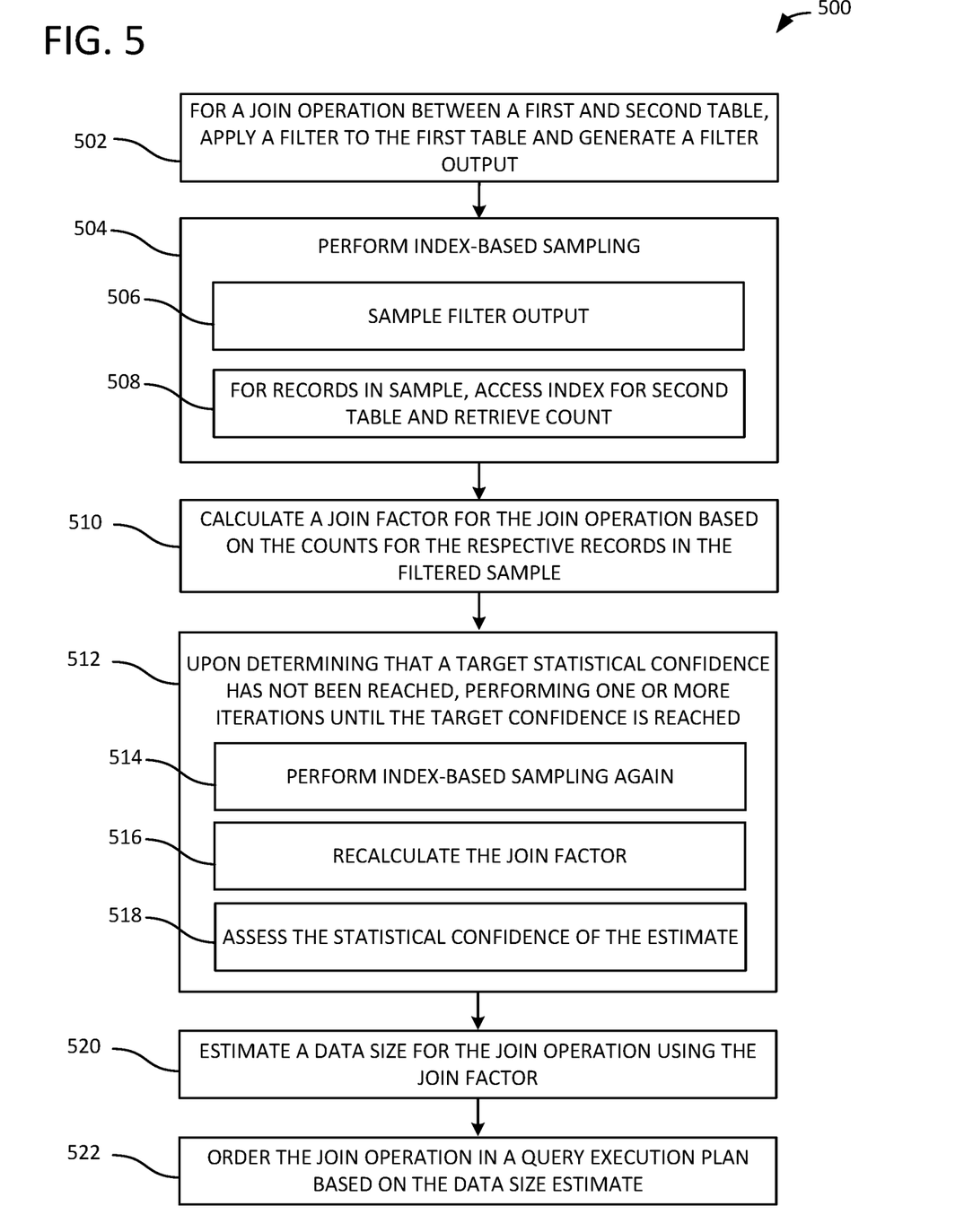
FIG. 5 illustrates an example method of estimating join size in which the join operation is ordered in a query execution plan.

FIG. 5 illustrates an example method 500 of estimating join size. In process block 502, for a join operation between a first table and a second table, the join operation being associated with executing a received query, filter is applied to the first table and a filter output is generated. Index-based sampling is performed in process block 504. Index-based sampling comprises sampling the filter output to generate a filtered sample in process block 506, the filtered sample comprising a plurality of records from the filter output, and, in process block 508, for the respective plurality of records in the filtered sample, accessing an index for the second table and retrieving a count of records in the second table corresponding to the record in the filtered sample.

In process block 510, a join factor for the join operation is calculated based on the counts for the respective records in the filtered sample. In process block 512, upon determining that a target statistical confidence for the join factor has not been reached, one or more iterations are performed until the target statistical confidence is reached. The iterations comprise process blocks 514, 516, and 518. In process block 514, the index-based sampling is performed again. In process block 516, the join factor is recalculated. In process block 518, the statistical confidence for the join factor is assessed.

A data size for the join operation is estimated using the join factor in process block 520, and a join operation in a query execution plan for the received query is ordered in process block 522 based on the estimated data size.

Detailed Examples

Consider the equi-join $\sigma_p(A) \bowtie \sigma_q(B)$, which is either of arity many-to-many or has filtering on the primary key source, where $\sigma_p$ is a filter predicate applied to table A and where $\sigma_q$ is a filter predicate applied to table B. In the first case, sampling from A is generally chosen, defined to have a cardinality to distinct count ratio closer to 1 than B. Otherwise, A is defined to be the filtered primary key source, i.e. p is not a tautology. Say that:

$$J = |\sigma_p(A) \bowtie \sigma_q(B)| \quad (1)$$

$$J' = |\sigma_p(A) \bowtie B| \quad (2)$$

The join factor μ is defined to be the ratio of the true size of the join between $\sigma_p$ (A) and its unfiltered join partner B (J', shown in Equation 2) to the size of the filtered base table being sampled, $|\sigma_p$ (A)$|$. That is, $$\mu = \frac{J'}{|\sigma_p(A)|} \quad (3)$$

Now, applying a uniformity and independence assumption, it follows that $$J \approx \frac{|\sigma_q(B)|}{|B|} J' \quad (4)$$

Note that with an estimated join factor $\hat{\mu}$, an estimate on the size of the equi-join, $\hat{J}$, can be deduced as follows $$\hat{J} = \frac{|\sigma_q(B)|}{|B|} |\sigma_p(A)| \hat{\mu} \quad (5)$$

Under certain conditions, SAP IQ can compute the exact values of $|\sigma_p$ (A)$|$, $|\sigma_q$ (B)$|$ and the result sets $\sigma_p$ (A), $\sigma_q$ (B) prior to join order selection. Thus, the goal is to produce an accurate estimate of $\hat{\mu}$. Essentially, samples on $\sigma_p$ (A) are used to look up the number of tuples in B that match in join attribute values and are estimated to pass the filter predicate q. This number is referred to as a filtered match count because the count of matching or joining tuples in B is scaled by the selectivity of q. Given a sample $S\sigma_p$ (A) on $\sigma_p$ (A), we access the counts of joining tuples in B using a B+ Tree index, all while never materializing the join between the two relations. Thus, $\sigma_p(A) \bowtie \sigma_q(B)$ is not sampled. Rather, based on a sample of $\sigma_p$ (A), the sum of filtered match counts is cheaply computed.

The uniformity assumption that the ratio of the joining tuples that satisfy q is equal to q's selectivity in all match counts is then applied. Various approaches can be used for establishing statistical confidence, including those using adaptive statistics. Specifically, sampling can be done in rounds, wherein after a fixed number of rounds have passed, variance-based calculations are used to perform a quality test used to determine if more sampling is required. If this is the case, the minimum sample size for the subsequent round is computed. However, block-level sampling is not performed and joins are not fully computed. Instead, samples are drawn from $\sigma_p$ (A), and filtered match count sums are utilized as opposed to computing $S_{\sigma_p(A)} \bowtie \sigma_q(B)$.

Say that K rounds of sampling on $\sigma_p$ (A) are performed. In the $i^{th}$ round of sampling, $$n_i = |S_{\sigma_p(A)}{}^i| \quad (6)$$

with Xi being the sum of filtered match counts. For each round, we have that $$\hat{\mu}_i = \frac{\sum_{i=1}^{K} X_i}{\sum_{i=1}^{K} n_i} \quad (7)$$

Using the central limit theorem, we have that $$\hat{\mu}_i \sim N\left(\mu, \frac{\sigma^2}{n_i}\right) \quad (8)$$

where $\sigma^2$ is the population variance of match counts. With this result, a variance-based quality test can be applied to an estimated upper bound on $\sigma^2$. For example, a quality test such as that used in (paper) can be used. Moreover, if the quality test fails, the minimum sample size required to pass in the subsequent round can be deduced using said calculations.

In these examples, an estimate is only injected into the query optimizer's cost model if the quality test indicates that the variance metric of choice is sufficiently low. Should the quality test fail and another round of adaptive sampling would exhaust the budget, a default approach using constant time estimates can be used.

Table 1, below, illustrates a specific join size estimation approach consistent with the equations 1-8 and method 400 of FIG. 4: EstimateJoinSize(A, B, budget). The inputs for the approach are a budget and base tables A and B. The budget is the number of permitted index lookups. An estimated size of the join $\sigma_p(A) \bowtie \sigma_q(B)$ is returned.

TABLE 1

Example Join Size Estimation

| NUMBER | OPERATION |
|---|---|
| 1 | i ← 0, $n_i$ ← $n_0$ {configurable}, N ← 0, X ← 0 |
| 2 | σ ← 0 {some form of variance metric} |
| 3 | while $n_i$ > 0 do |
| 4 | budget ← budget − $n_i$ |
| 5 | if budget ≤ 0 then |
| 6 | break |
| 7 | end if |
| 8 | $S_i$ ← Sample(A.ResultSetAfterFiltering, $n_i$) |
| 9 | $X_i$ ← GetMatchCountSum($S_i$, B.Index) |
| 10 | N ← N + $n_i$, X ← X + $X_i$ |
| 11 | σ ← UpdateVarianceEstimate(σ, X, $X_i$, $n_i$, N, i) |
| 12 | ifQualityTest(X, N, σ) then |
| 13 | return $\left(\frac{\|\sigma_q(B)\|}{\|B\|}\right) * \|\sigma_p(A)\| * \frac{X}{N}$ |
| 14 | end if |
| 15 | $n_i$ ← NextSampleSize(X, N, σ, $X_i$, $n_i$, i) |
| 16 | i ← i + 1 |
| 17 | end while |
| 18 | return FailureFlag |

In Table 1, an index lookup budget is decremented in operation 4 and checked in operation 5 to ensure the budget is not exhausted. A filter output of table A is sampled in operation 8, and match counts are retrieved from the index of table B in operation 9. In operation 10, a global sample size N is updated with the current iterations sample size $n_i$, and a global match count X is updated with the current iteration's match count $X_i$. X/N is the join factor, $\mu$. A variance calculation is performed in operation 11 using the join factor, and operation 12 determines if a desired statistical confidence has been reached through a quality test, which checks to see if the variance metric is sufficiently small (e.g., has met a threshold). If so, then a join size is estimated in operation 13 using the join factor per Equation 5. If the desired confidence has not been reached, then a sample size for the next iteration is determined in operation 15. The next sample size can be determined using the variance metric, fixed values, or a formula concerning the size of the population (filter output of A).

To evaluate the described examples, a subset of queries was selected from an open source, industry-standard benchmark based on the presence of joins having characteristics inappropriate for a default estimation approach. The accompanying synthetic data set was generated with moderate frequency skew using opensource software. Three metrics were considered: overall workload execution time, Q-errors in cardinality estimates for two-table joins, and individual query execution time. With regards to overall workload time, the described examples exhibited a 16% improvement relative to SAP IQ's estimation algorithm. For 31% of the evaluated queries, introducing adaptive join size estimation improved the individual query execution time. Conversely, only two of the queries showed a decrease in performance despite superior estimates.

For individual query execution times, the mean, maximum, and minimum percentage improvements were 14%, 88%, and −16% respectively. Of the queries with improved execution plans, the mean improvement in execution time was 55%. Noted improvements in query execution plans were attributed to changes in both join order and physical algorithms. Moreover, in 75% of the queries that were improved by the described examples, dimension tables were entirely sampled within the budget due to their relatively small size. One such query exhibited a query execution time improvement of 88%.

The improvements in execution time and minimal overhead observed suggest that SAP IQ and other OLAP systems could benefit from index-based adaptive sampling.

Example Computing Systems

Figure 6:
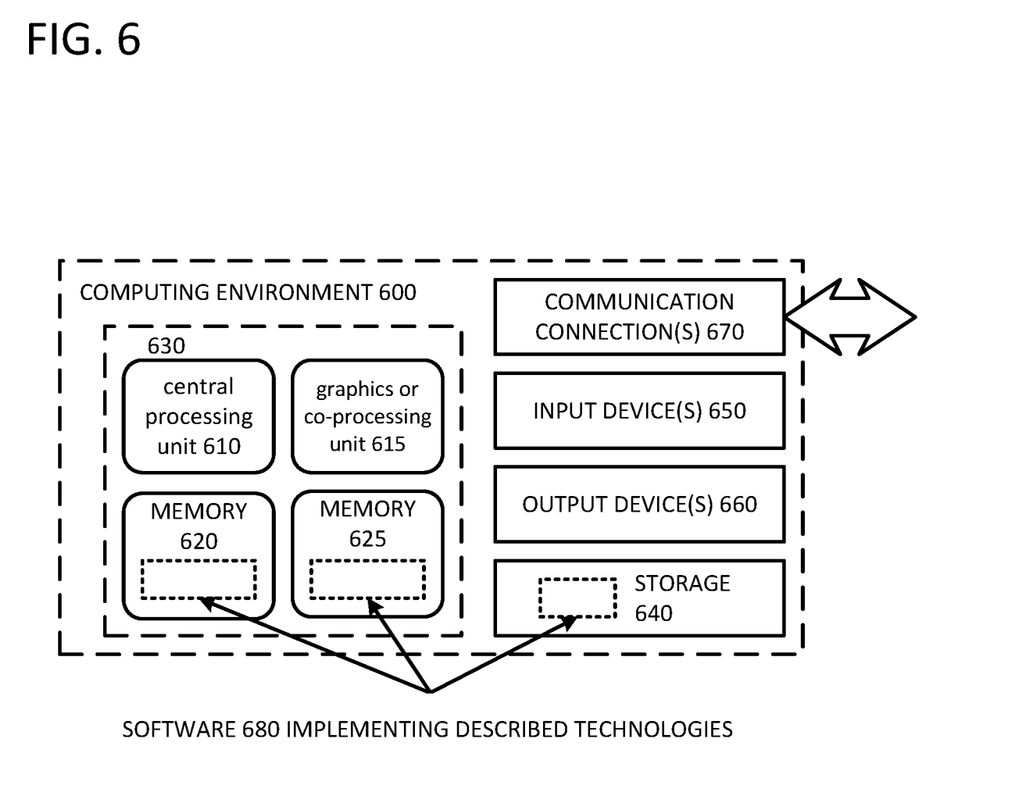
FIG. 6 is a diagram illustrating a generalized implementation environment in which some described examples can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s). For example, memory 620 and 625 can store join size estimator 216 of FIG. 2.

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more innovations described herein. For example, storage 640 can store join size estimator 216 of FIG. 2.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method of estimating join size, the method comprising:
   (a) applying a filter to a first table in a join operation between the first table and a second table and generating a filter output;
   (b) based on a sample size, sampling the filter output to generate a filtered sample, the filtered sample comprising a plurality of records from the filter output;
   (c) for the plurality of records in the filtered sample, accessing an index for the second table and retrieving counts of records in the second table corresponding to the plurality of records in the filtered sample;
   iterating (b)-(c) with a new value for the sample size until a statistical confidence in a join factor based on the counts of records and sample size has been reached;
   estimating a data size for the join operation based on the counts of records in the second table corresponding to the plurality of records in the filtered sample; and
   based on the estimated data size for the join operation, determining or modifying a query execution plan as part of query optimization for a query comprising the join operation.

2. The method of claim 1, wherein the iterating is stopped when a resource expenditure threshold is reached.

3. The method of claim 2, wherein the resource expenditure threshold is an available index lookup count, the method further comprising before or after each iteration, decrementing the available index lookup count by the sample size for the iteration.

4. The method of claim 3, further comprising upon reaching the resource expenditure threshold, estimating the data size for the join operation with a default estimation approach.

5. The method of claim 1, wherein the statistical confidence is determined using a variance-based approach that assesses the sampling and the retrieved counts of records.

6. The method of claim 1, further comprising prior to sampling the filter output, determining that the join operation has one or more characteristics indicating that a default size estimation approach is likely to be inaccurate.

7. The method of claim 6, wherein the one or more characteristics include the join operation being a many-to-many join or a one-to-many join with filtering on the first table.

8. The method of claim 1, wherein determining or modifying the query execution plan for the query comprises at least one of ordering the join operation relative to other operations in the query execution plan or selection of a physical algorithm for the join operation.

9. The method of claim 1, further comprising sampling the records in the second table corresponding to the records in the filtered sample to create an intermediate sample.

10. The method of claim 9, further comprising estimating a data size for a join operation between the intermediate sample and a third table.

11. A computing system configured to execute computer-readable instructions for performing join size estimation operations, the operations comprising:
    for a join operation between a first table, to which a filter has been applied, and a second table, performing iterations until a statistical confidence in a join factor for the join operation has been reached, the iterations comprising:
        using a sample size, sampling a filter output of the filter to generate a filtered sample, the filtered sample comprising a sample size number of records from the filter output;
        for records in the filtered sample, accessing an index for the second table and retrieving counts of records in the second table corresponding to the records in the filtered sample;
        calculating the join factor based on the counts of records in the second table corresponding to the records in the filtered sample and the sample size of the filtered sample; and
        upon determining that a statistical confidence in the join factor has not yet been reached, determining a new value for the sample size for a next iteration;
    estimating a data size for the join operation using the join factor; and
    based on the estimated data size for the join operation, determining or modifying a query execution plan incorporating the join operation as part of query optimization.

12. The system of claim 11, wherein the statistical confidence is determined through a variance-based approach.

13. The system of claim 11, wherein the iterations further comprise upon determining that a resource expenditure threshold has been reached and that the statistical confidence has not yet been reached, ending the iterations.

14. The system of claim 11, wherein the operations are performed after determining that the join operation has one or more characteristics indicating that a default size estimation approach is likely to be inaccurate.

15. The system of claim 11, wherein the operations further comprise upon determining that a statistical confidence in the data size estimate has been reached, ending the iterations and determining or modifying a query execution plan for a query corresponding to the join operation based on the data size estimate.

16. One or more non-transitory computer storage devices storing computer-executable instructions for estimating join size, the estimating comprising:
    for a join operation between a first table and a second table, the join operation being associated with executing a received query, applying a filter to the first table and generating a filter output;
    performing index-based sampling, comprising:
        sampling the filter output to generate a filtered sample, the filtered sample comprising a plurality of records from the filter output; and
        for the plurality of records in the filtered sample, accessing an index for the second table and retrieving counts of records in the second table corresponding to the plurality of records in the filtered sample;
    calculating a join factor for the join operation based on the counts of records in the second table corresponding to the plurality of records in the filtered sample;
    upon determining that a target statistical confidence for the join factor has not been reached, performing one or more iterations until the target statistical confidence is reached, the iterations comprising:
        performing the index-based sampling again;
        recalculating the join factor; and
        assessing the statistical confidence for the recalculated join factor;
    estimating a data size for the join operation using the join factor; and
    ordering the join operation in a query execution plan for the received query based on the estimated data size.

17. The non-transitory computer storage devices of claim 16, wherein the iterations further comprise determining a new sample size for performing the index-based sampling again.

18. The non-transitory computer storage devices of claim 16, wherein for the iterations, the join factor is calculated by dividing the retrieved count of records by the sample.

* * * * *